Jan. 9, 1968     O. J. MELHUS     3,363,197
CIRCUIT ARRANGEMENT FOR ELECTRIC CLOCKS
COMPRISING MECHANICAL OSCILLATORS

Filed June 1, 1965     3 Sheets-Sheet 1

INVENTOR
OLE J. MELHUS

BY
ATTORNEY

INVENTOR
OLE J. MELHUS

BY

ATTORNEY

United States Patent Office 3,363,197
Patented Jan. 9, 1968

3,363,197
CIRCUIT ARRANGEMENT FOR ELECTRIC CLOCKS COMPRISING MECHANICAL OSCILLATORS
Ole Johan Melhus, Kirchheim unter Teck, Germany, assignor to International Standard Electric Corporation, New York, N.Y., a corporation of Delaware
Filed June 1, 1965, Ser. No. 460,381
Claims priority, application Germany, June 3, 1964, St 22,201
6 Claims. (Cl. 331—116)

ABSTRACT OF THE DISCLOSURE

A circuit arrangement for an electric clock comprising a mechanical oscillator as a movement or speed regulator, and an oscillator mounted coil cooperating with a permanent magnet which is either mounted with the oscillator or is of the stationary type. The coil is connected to the collector of a first transistor and the output electrode of the first transistor is connected to the input electrode of a second transistor, such that from the output-emitter electrode of the second transistor a positive feedback voltage is applied directly to the input-emitter electrode of said first transistor.

---

Figure 1:
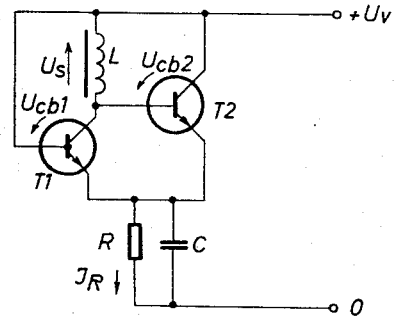

The present invention relates to several circuit arrangements for electric clocks (wrist watches, alarm clocks, table clocks, and the like) in which, as movement or speed regulators there are used mechanical oscillators whose oscillation is maintained electro-magnetically.

Various types of embodiments have already become known for replacing the balance or fly wheel by mechanical types of oscillators. These oscillators may be tuning forks or similar structures having a natural or inherent frequency of several hundred cycles per second; they have a very good stability of frequency, and a high Q-factor. The oscillators are driven by a transistor circuit which is operated from a mono cell.

The electromagnetic coupling is effected thereby in a similar way as in a moving coil loudspeaker in a fixed magnetic field, or vice versa. In the hitherto conventional types of circuit arrangements there are always provided two coils, with the one coil—the driving coil—being connected to the output of the transistor amplifier. The other coil—the control coil—is in such a way connected to the input of the amplifier that there will result a positive feedback (cf. e.g. German printed applications (DAS) 1,039,945 and 1,043,962).

These conventional types of arrangements bear the considerable disadvantage of requiring at least two separate coils with two connecting or terminal wires each. These coils are wound with a very thin copper wire (0.015–0.020 mm.) and, therefore, are relatively expensive. Moreover, in the case of oscillators employing moving coils and stationary magnets, the coil lead-in conductors cause an additional unwanted damping.

The arrangements according to the present invention are aimed at avoiding the disadvantages of the conventional types of arrangements, especially in that they do no longer require two, but only one coil.

Accordingly, the invention relates to a circuit arrangement for an electric clock comprising a mechanical oscillator, such as a tuning fork, or the like, as a movement or speed regulator, as well as one stationary or oscillator-mounted coil co-operating with a permanent magnet which is either mounted to the oscillator, or is of the stationary type, with the coil being connected as the collector impedance of a controllable semiconductor. The invention is characterized by the fact that the output electrode of the controllable semiconductor is connected to the input electrode of a second controllable semiconductor from the output electrode of which a positive feedback voltage is applied via a galvanic (metallic) connection to the input electrode of the said first controllable semiconductor.

Consequently, in this novel type of arrangement, the necessary positive feedback and the phase shift required in the course of this, is not realized with the aid of a second coil, but in the circuit itself. The thus arising expenditure of one additional transistor is a very small one compared with that of an additional coil because, as is well-known, transistors, unlike coils, can be manufactured very inexpensively in large amounts. When using an integrated circuit in which both the non-linear and the linear components are evaporated on to a base layer, the costs resulting for the further transistor are almost insignificant.

In a particularly favourable manner the arrangements can be built-up with the aid of silicon-planar transistors, because these transistors provide a good current amplification at small currents (some microamperes), and very small residual back-currents. These properties of the transistors are very important because the circuit arrangement may only have a small current consumption in order to provide a long as possible service life of the battery. With respect to the silicon-planar transistors preference should be given to the npn-types of structures, as this is more inexpensive than the pnp-type.

Figure 1A:
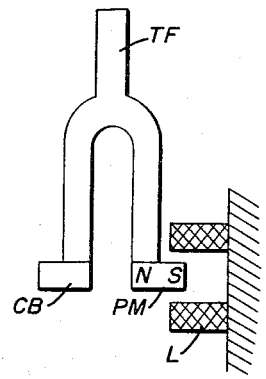
Figure 2:
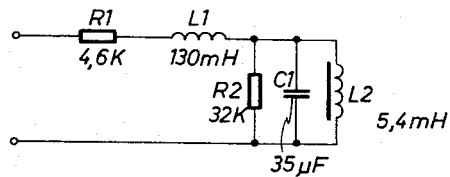
Figure 3:
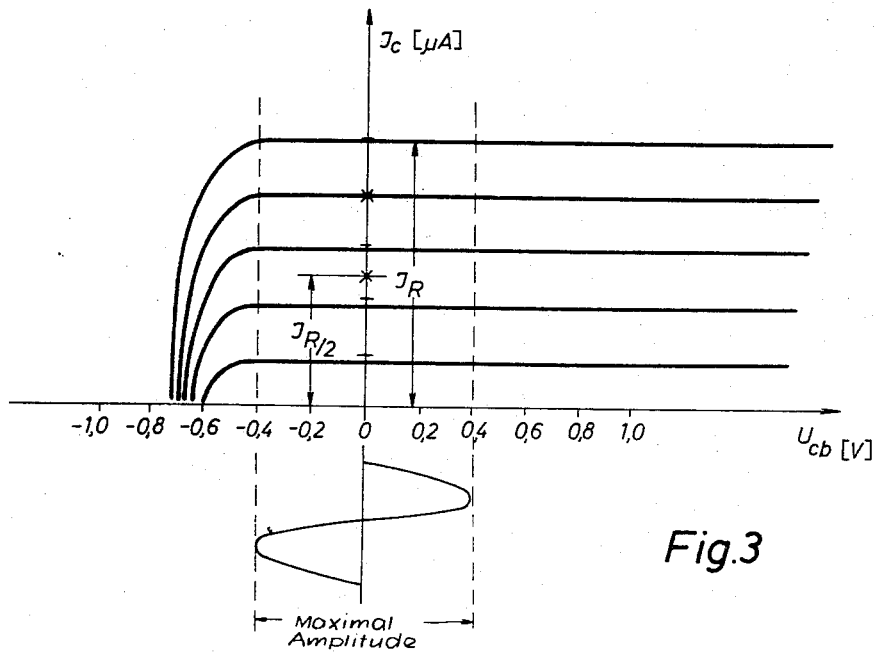
Figure 4:
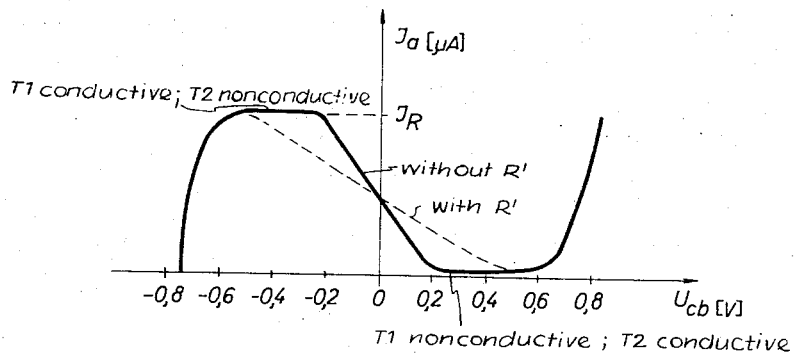
Figure 5:
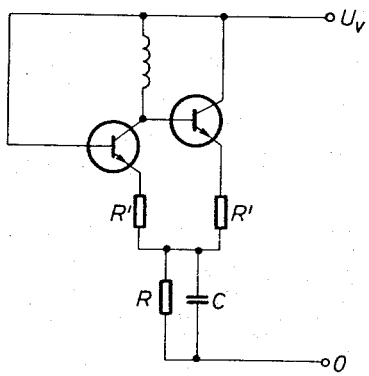
Figure 6:
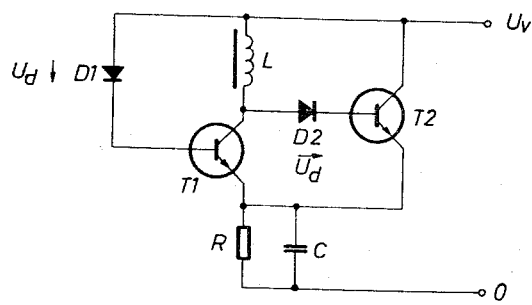
Figure 7:
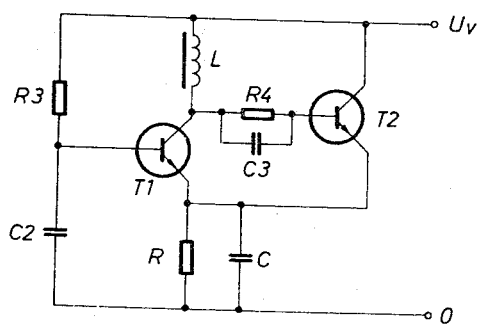

The invention will now be explained by way of example with reference to FIGS. 1 to 7 of the accompanying drawings, in which:

FIG. 1 shows the circuit arrangement,
FIGURE 1a shows a mechanical oscillator as related to the circuit arrangement of FIGURE 1,
FIG. 2 shows the equivalent circuit diagram of a tuning fork used as the oscillator,
FIG. 3 shows the family of characteristics $I_c = f(U_{cb})$ of an npn-type silicon-planar transistor,
FIG. 4 shows the output family of characteristics of the circuit,
FIG. 5 shows a modification of the circuit arrangement according to FIG. 1,
FIG. 6 shows another modification of the circuit arrangement according to FIG. 1, and
FIG. 7 shows a further modification of the circuit arrangement according to FIG. 1.

The circuit arrangement according to FIG. 1 comprises a transistor T1 which is operated in a grounded base circuit, with the collector impedance of the transistor T1 being the oscillator coil L. The oscillator coil is arranged between the collector electrode of the transistor T1 and the one pole of the supply voltage. The transistor T1 is followed by a second transistor T2 operated in a grounded collector circuit, i.e. in such a way that the collector electrode of the transistor T1 is connected to the base electrode of the transistor T2. The feedback voltage is taken off the emitter electrode of the transistor T2, which is galvanically (metallically) connected to the emitter electrode of the first transistor T1.

FIGURE 1a shows a tuning fork TF, and when only one coil L is employed to cooperate with permanent magnet prong PM, the other prong will have a corresponding weight counter-balance CB. This arrangement, in conjunction with the circuit of FIGURE 1 which provides the necessary positive feedback and phase shift, will maintain the natural or inherent frequency of the tuning fork.

FIG. 2 shows the equivalent circuit diagram of the system capable of oscillating, and which co-operates with the amplifier. The natural or inherent frequency of the oscillator which, in this case, is a tuning fork, amounts to 360 c.p.s. This is represented by the parallel oscillating circuit $L_2C_1$. $R_2$ replaces the mechanical damping of the tuning fork. $R_1$ and $L_1$ are both the ohmic resistance and the inductance of the oscillator coil L. Since $\omega_0 L_1$ is much less than $R_1$, the equivalent circuit diagram at point $\omega=\omega_0$ substantially consists of the parallel oscillator or resonant circuit $L_2C_1$ with the preceding resistor $R_1$.

It is assumed that in the circuit arrangement according to FIG. 1, both transistors have equal base-emitter characteristics. If now the oscillator voltage $U_s=0$, then the current $I_R$ is equally distributed to both transistors. FIG. 3 shows the output family of characteristics of a silicon-planar type of transistor in a grounded base circuit. The operating point of the two transistors at $U_s=0$ is determined by $I_s=IR/2$ at $U_{cb}=0$. Accordingly, both transistors are in the linear area. Since the circuit arrangement represents an amplifier with a positive feedback, this operating point is an instable one. The load resistance of the amplifier is a parallel-resonant circuit, and accordingly an oscillation is built-up with the natural or inherent frequency of the parallel-resonant circuit. The oscillation amplitude in the built-up condition is dependent upon the emitter current and, consequently, upon the value of resistor R. The capacitor C which, in the present case, has a capacitance of 5 nf, serves to suppress unwanted high-frequency oscillations.

Due to the positive feedback there is formed at the output, and symmetrically around $U_{cb}=0$, a range with a negative resistance serving to reduce the damping of the oscillator circuit. One typical output characteristic of the circuit is shown in FIG. 4. The inclination of the characteristic around $U_{cb}=0$ corresponds to the numerical value of the negative conductance, and is dependent upon the inclination of the collector current-base-emitter current-characteristics ($I_c=f(U_{be})$), of the transistors at the chosen operating point. By way of inserting emitter resistors R in the circuit, as shown in FIG. 5, the inclination of the $I_c-U_{be}$-characteristics is reduced, or else the numerical value of the negative output resistance is enlarged.

The quality of the oscillating system is dependent upon the terminal resistance. This terminal resistance is constituted in the circuit by the parallel connection of both the output resistance of the base circuit and of the input resistance of the collector circuit. From FIG. 4 it may be seen that the output resistance of the circuit up to $U_{cb1}\approx \pm 0.4$ volt is a very high one.

Within the linear range the input resistance of the collector circuit is determined by the parallel connection of R and the input resistance of the base circuit, multiplied with the current gain of $T_2$ in the grounded-collector circuit. This resistance likewise is high-ohmic up to $U_{cb1}$ approximately equal to +0.4 volt. In the case of the employed tuning fork the operating amplitude of the oscillator voltage amounts to about ±170 mv. This amplitude was achieved with $R=70$ kilohm at $U_v=1$ volt. In this case the medium current intake amounted to 8.3 milliamperes. The current gain value of the transistors in the grounded-emitter circuit is not critical. In the case of $I_c=5$ milliamperes and $U_{cb}=0$ ($U_{ce}\sim 0.5$ volt), however, it should be greater than 10.

With respect to oscillating systems in which the operating amplitude of the oscillating voltage is greater than approximately ±400 mv., the operating points of the transistors may be shifted. In FIG. 6 the base voltages of the transistors are shifted about the diode voltages $U_d$. The diodes D1 and D2, in this case, are each time arranged to precede the base electrodes of the transistors T1 and T2. With the aid of this circuit the oscillation amplitude may be approximately double as high.

FIG. 7 shows a circuit in which the operating points are shifted with the aid of resistors R3 and R4 arranged in front of the base electrodes. The layout of this circuit, however, is more critical than the others, because the operating point is dependent upon the current gain of the transistors. R4 is used to set the bias point of transistor T2, and capacitor C3 is an AC by-pass capacitor.

The coil L may be designed either as an individual coil arranged on one prong of the tuning fork, i.e. as a stationary coil, or else as two series-connected coils which are seated on both prongs of the tuning fork, which are connected in series. When employing only one coil, a corresponding counterbalance will be required on the second prong of the tuning fork.

What is claimed:
1. A circuit arrangement for an electric clock comprising:
   a mechanical oscillator;
   a coil element;
   a permanent magnet element disposed in operative relation to said coil element;
   means mounting at least one of said elements on said mechanical oscillator;
   first and second transistors, said first transistor is operated in a grounded-base circuit and said second transistor is operated in a grounded-collector circuit, and the emitter electrodes of said two transistors are connected together and, by means of the parallel connection of both a first resistor and a first capacitor, are connected to one pole of a source of voltage;
   the collector electrode of said first transistor is connected to the base electrode of said second transistor, and to this point there is connected one end of said coil element, with the other end of said coil element being connected to the base electrode of said first transistor, to the collector electrode of said second transistor, and to the other pole of said source of voltage; and
   a positive feedback voltage is applied from the output-emitter electrode of said second transistor to the input-emitter electrode of said first transistor.

2. A circuit according to claim 1 including a second resistor connected between said first resistor and the emitter of said first transistor, and a third resistor connected between said first resistor and the emitter of said second transistor.

3. A circuit according to claim 1 including a first diode connected between the base of said first transistor and the other pole of said source of voltage, and a second diode connected between the collector of said first transistor and the base of said second transistor.

4. A circuit according to claim 1 including:
   a second resistor connected between the other pole of said source of voltage and the base of said first transistor;
   a second capacitor connected between the base of said first transistor and the one pole of said source;
   a third resistor connected between the collector electrode of said first transistor and the base electrode of said second transistor; and
   a third capacitor connected in parallel to said fifth resistor.

5. A circuit arrangement for an electric clock according to claim 1, wherein said mechanical oscillator is a tuning fork with at least one of said elements disposed on one prong of the tuning fork, and the other prong of said fork is provided with a counterweight corresponding to the weight of said one element.

6. A circuit arrangement for an electric clock according to claim 1, where said first and second transistors are NPN-type silicon-planar transistors.

References Cited

UNITED STATES PATENTS

| | | | |
|---|---|---|---|
| 2,960,817 | 11/1960 | Hetzel | 311—116 X |
| 2,986,683 | 5/1961 | Lavet, et al. | 318—132 |
| 3,116,466 | 12/1963 | Grib | 331—156 X |

ROY LAKE, *Primary Examiner.*

J. B. MULLINS, *Assistant Examiner.*